US010385962B2

(12) United States Patent
Kuperman

(10) Patent No.: US 10,385,962 B2
(45) Date of Patent: Aug. 20, 2019

(54) DIRECT LUBRICATING INPUT SHAFT ASSEMBLY

(71) Applicant: Frank C. Kuperman, Charlotte, NC (US)

(72) Inventor: Frank C. Kuperman, Charlotte, NC (US)

( * ) Notice: Subject to any disclaimer, the term of this patent is extended or adjusted under 35 U.S.C. 154(b) by 89 days.

(21) Appl. No.: 15/333,974

(22) Filed: Oct. 25, 2016

(65) Prior Publication Data

US 2018/0112765 A1    Apr. 26, 2018

(51) Int. Cl.
*F16C 1/24*    (2006.01)
*F16H 57/04*   (2010.01)
*F16C 3/02*    (2006.01)

(52) U.S. Cl.
CPC .............. *F16H 57/043* (2013.01); *F16C 3/02* (2013.01); *F16H 57/0428* (2013.01); *F16H 57/0473* (2013.01)

(58) Field of Classification Search
CPC .................................. F16C 3/02; F16H 57/043
USPC ......... 464/7, 183; 192/3.29; 285/129.1, 924; 138/111, 113
See application file for complete search history.

(56) References Cited

U.S. PATENT DOCUMENTS

| 280,919 | A | * | 7/1883 | Du Shane | H01B 9/0611 138/113 X |
|---|---|---|---|---|---|
| 1,638,796 | A | * | 8/1927 | Cares | F16D 3/06 464/7 |
| 4,195,718 | A | * | 4/1980 | Schmohe | F16D 1/10 |
| 5,277,242 | A | * | 1/1994 | Arrington | B22D 13/105 138/113 |
| 6,315,691 | B1 | * | 11/2001 | Fredriksen | F16D 25/061 |
| 7,442,142 | B2 | * | 10/2008 | Kitahara | F16H 57/043 |
| 8,025,081 | B2 | * | 9/2011 | Poskie | F16C 3/02 |
| 8,678,937 | B2 | * | 3/2014 | Humes | F16D 1/10 464/7 |
| 2008/0083593 | A1 | * | 4/2008 | Huegel | F16D 25/12 192/3.29 |

FOREIGN PATENT DOCUMENTS

GB           591731      *    8/1947

OTHER PUBLICATIONS

Universal Joint and Driveshaft Design Manual, AE-7, Society of Automotive Engineers, Inc., Warrendale, PA, Chapter 7, TJ1079. S62 1979 (Year: 1979).*

* cited by examiner

*Primary Examiner* — Greg Binda
(74) *Attorney, Agent, or Firm* — Seth L. Hudson; Clements Bernard Walker PLLC

(57) ABSTRACT

Transmission input shaft that includes a rearward end, a forward end, an interior circumferential surface, and an outer circumferential surface. A lubrication channel is positioned between the interior surface and the outer surface.

16 Claims, 3 Drawing Sheets

DIRECT LUBRICATING INPUT SHAFT ASSEMBLY

FIELD OF THE INVENTION

The present invention relates generally to an input shaft for direct lubrication, and more generally relates to an input shaft for direct lubrication that provides an outlet port for dispersing a lubricant at a relatively constant rate.

BACKGROUND OF THE INVENTION

Input shafts, and in particular transmission input shafts, generally transfer power from a power supply source to a means of output device, such as a gearbox, transfer box or the like. A transmission input shaft obtains the turning motion from the engine and is engaged to an output device such as a clutch assembly or overdrive clutch assembly. These input shafts are normally supported for rotation by bearings in the transmission housing forward wall and have a first inwardly extending end carrying an input gear and a second outwardly extending end provided with external splines for receiving the internal splines of a driven hub of a coupling member, such as a master friction clutch or torque converter that directly connects the transmission input shaft to the vehicular engine.

A transmission input shaft has a bushing slot that allows oil to flow from the central bore of the transmission input shaft to a portion of the clutch assembly for providing lubrication to the clutch assembly. The bushing slot provides oil at a very slow rate and fails to provide adequate heat dissipation from the steel reaction plates in the clutch assembly. The extreme heat generated during the initial clutch apply on the 3-4 upshift will quickly cone or warp the steel reaction plate/friction plate. Once the reaction plate begins to warp, it then creates drag when it is not applied during the $1^{st}$, $2^{nd}$, and $3^{rd}$ gears. The drag inadvertently partially applies the overdrive clutch when it should not be applied. The warping causes further warping and eventual total failure.

It is an object of the present invention to provide an input shaft that can provide a requisite and consistent amount of oil to a clutch assembly or other attachment to provide adequate lubrication and heat dissipation.

BRIEF SUMMARY OF THE INVENTION

According to an embodiment of the present invention, a shaft that includes a rearward end, a forward end, an interior surface, and an outer surface. A lubrication channel is positioned between the interior surface and the outer surface.

According to another embodiment of the present invention, the shaft includes a lubrication channel that extends between the interior surface and the forward end.

According to yet another embodiment of the present invention, the shaft includes a forward end that includes a top portion and the lubrication channel extends between the interior surface and the top portion of the forward end.

According to yet another embodiment of the present invention, the shaft includes an interior surface that is generally circumferential.

According to yet another embodiment of the present invention, the shaft includes an outer surface that is generally circumferential.

According to yet another embodiment of the present invention, the shaft includes a trough disposed adjacent an exit of the lubrication channel.

According to yet another embodiment of the present invention, the shaft includes a generally circular lubrication channel.

According to yet another embodiment of the present invention, the shaft includes an entrance to the lubrication channel that is positioned in the axial direction, and after a distance the lubrication channel proceeds in the longitudinal direction as the lubrication channel proceeds towards the forward end.

According to yet another embodiment of the present invention, a transmission input shaft includes a rearward end, a forward end, an interior circumferential surface, and an outer circumferential surface. A lubrication channel is positioned between the interior surface and the outer surface.

According to yet another embodiment of the present invention, the transmission input shaft includes a lubrication channel that extends between the interior surface and the forward end.

According to yet another embodiment of the present invention, the transmission input shaft includes a forward end that includes a top portion and a lubrication channel extends between the interior surface and the top portion of the forward end.

According to yet another embodiment of the present invention, the transmission input shaft includes a trough disposed adjacent an exit of the lubrication channel.

According to yet another embodiment of the present invention, the transmission input shaft includes a generally circular lubrication channel.

According to yet another embodiment of the present invention, the transmission input shaft includes an entrance to the lubrication channel that is positioned in the axial direction, and after a distance the lubrication channel proceeds in the longitudinal direction as the lubrication channel proceeds towards the forward end.

According to yet another embodiment of the present invention, the transmission input shaft includes a rearward end, a forward end with a top portion, an interior surface, and an outer surface. A lubrication channel is positioned between the interior surface and the outer surface having an entrance disposed within the interior surface and an exit on the top portion of the forward end.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The present invention is at least partially described within the context of a cylindrical coordinate system. The adjectives "axial," "longitudinal," and "circumferential" are with respect to an orientation along the longitudinal axis of the shaft, extending along the central axis of the shaft.

Figure 1:
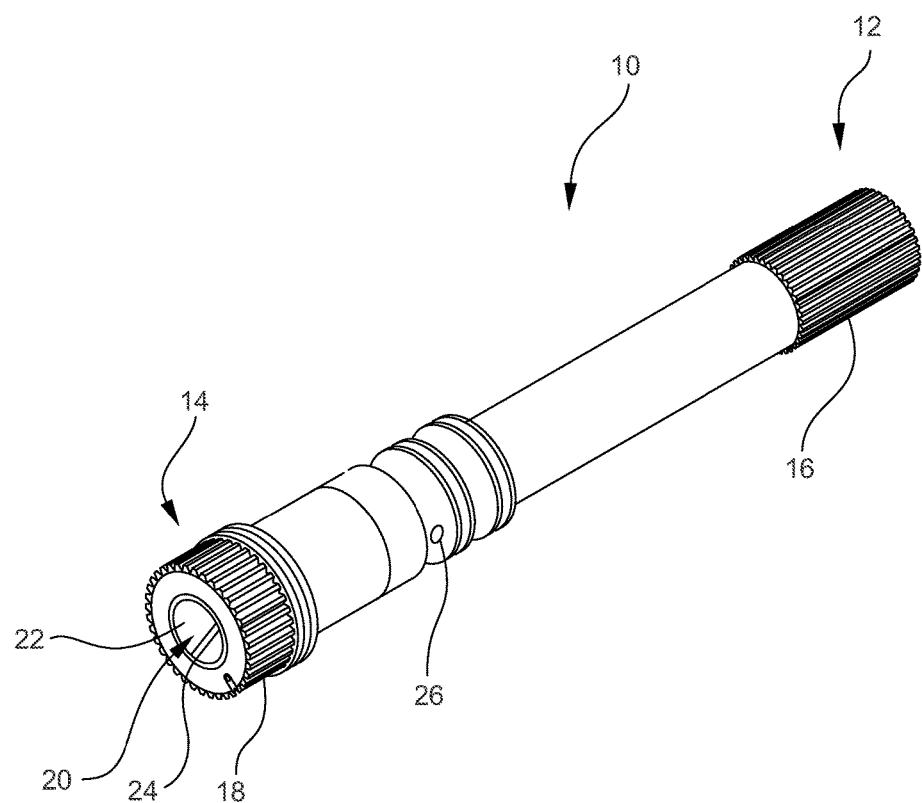
FIG. 1 is a perspective view of the input shaft of the present invention.
Figure 2:
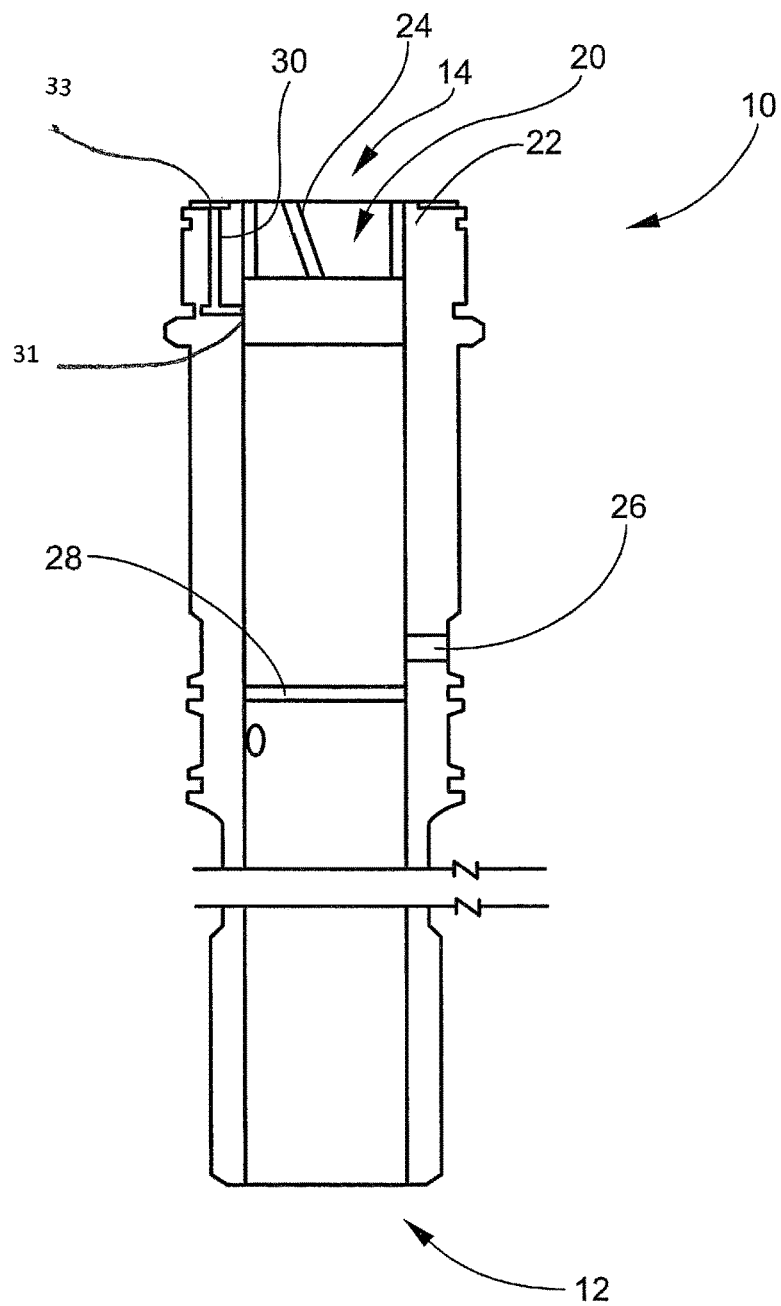
FIG. 2 is a cut way, side view of the input shaft of the present invention.
Figure 3:
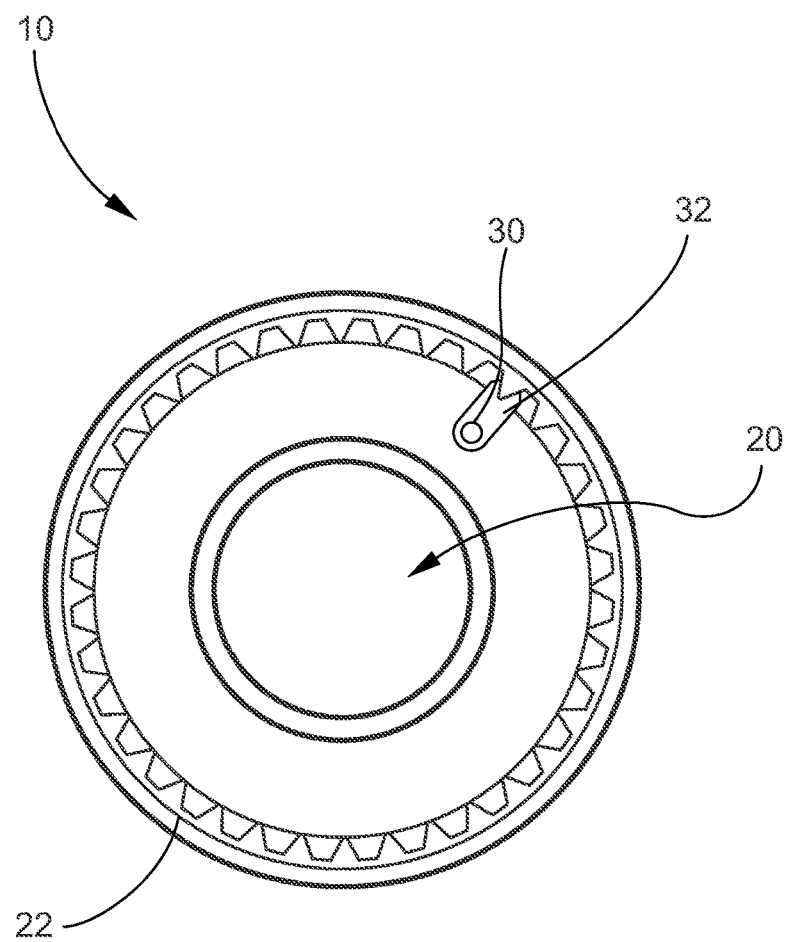
FIG. 3 is a top view of the input shaft of the present invention.

Referring now specifically to the drawings, an input shaft is illustrated in FIG. 1 and is shown generally at reference numeral 10. The input shaft 10 contains a rearward end 12 and a forward end 14 and an outer surface and an inner surface. The outer surface and inner surface may be circumferential. The rearward end 12 is commonly called a convertor turbine spline on a transmission input shaft. An input gear of a turbine hub (not shown) may be engaged to the rearward end 12 and is preferably separable from the shaft 10, but may also be integral. The rearward end 12 also contains a plurality of splines 16 for engaging the mating splines on an input gear of the turbine hub for providing rotational movement.

The forward end 14 of the shaft 10 contains a plurality of splines 18 spaced apart and around the outer circumference of the forward end 14. The forward end 14 is commonly called a spline input or clutchhub spline. The shaft 10 is generally hollow and contains a central bore 20 at the forward end 14 that includes an inner circumferential surface. A bushing 22 is disposed within the central bore 20 of the forward end 14. The bushing 22 may contain a bushing slot 24 for allowing oil to flow along the inner circumferential surface and out of the central bore 20, thus providing some lubrication to the clutch assembly or other element attached to the forward end 14 of the shaft 10.

The shaft 10 is generally hollow and contains an inner surface. A lubrication circuit feed hole 26 is disposed on the outer surface of the shaft 10. Generally, a pump stator (not shown) will introduce oil into the feed hole 26. The feed hole 26 extends from the outer surface to the inner surface, allowing oil to enter the feed hole 26. The oil proceeds through the feed hole 26 and into the hollow inner portion of the shaft 10. The oil is forced to the forward end 14 of the shaft 10 by centrifugal force. Preferably, a bridge 28 may be contained within the hollow inner portion of the shaft 10 that prevents the oil from flowing backwards and towards the rearward end 12.

As the oil is pumped into the feed hole 26, it progresses towards the forward end 14 by centrifugal force. A portion of the oil contacts the bushing slot 24 and proceeds towards the entrance of the central bore 20 and the clutch assembly. A direct lubrication channel 30 is disposed within the shaft 10. The entrance 31 to the direct lubrication channel 30 is positioned on the interior surface of the shaft 10. Preferably the entrance 31 to the direct lubrication channel 30 is positioned in close proximity to the forward end of the shaft 10. The channel 30 is positioned between the outer surface and inner surface. The channel 30 extends from the entrance 31 and proceeds between the outer surface and inner surface. The channel 30 proceeds to an exit 33 located on the top portion of the forward end 14. The entrance 31 of the channel 30 is meant to define the opening disposed on the interior surface of the shaft 10 at which oil enters the channel 30. The exit 33 of the channel 30 is meant to define the opening on the top portion of the forward end 14 at which the oil exits the channel 30. The channel 30 is preferably circular.

A portion of the oil located in the inner portion of the shaft 10 enters the entrance 31 to the channel 30 located on the inner circumferential surface. The oil is forced upwards through the hollow portion of the shaft 10, and a portion of the oil enters the entrance 31 to the channel 30. The oil proceeds along the channel 30 and in-between the outer surface and inner surface. The oil then exits the shaft 10 at the top portion of the forward end 14.

The channel 30 exit 33 is located on the top portion of the shaft 10. Preferably, the channel 30 exit 33 is centrally positioned between the inner surface and outer surface. The entrance 31 to the channel 30 is positioned on the interior surface and the channel 30 extends in the axial direction. After a distance, the channel 30 turns in the longitudinal direction and proceeds towards the top portion of the forward end 14. A distance is defined as a length between the interior surface and exterior surface of the shaft 10. The channel 30 extends in the axial direction between the interior surface and the exterior surface. As illustrated, the channel 30 makes about a 90 degree turn in transitioning between the axial and radial directions. However, the channel 30 may gradually change directions from the axial to the longitudinal direction.

A trough 32 may be positioned either adjacent or surrounding the exit 33 of the channel 30, as illustrated. The trough 32 extends along the top portion of the shaft 10 and towards the outer circumferential surface of the shaft 10. The purpose of the trough 32 is to direct the oil under a surface of a bearing of the clutch assembly that may sit above the top portion of the forward end 14. When a clutch assembly is engaged to the forward end 14 of the shaft 10, the oil is provided to the clutch assembly for lubrication and heat transfer. The trough 32 allows oil to travel beneath the surface of the bearing, and then exits the trough and proceeds to provide oil to the clutch assembly.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A generally hollow shaft, comprising:
   a rearward end containing a plurality of splines, a forward end containing a plurality of splines, an interior surface, and an outer surface;
   a central bore on the forward end of the generally hollow shaft;
   a bushing disposed within the central bore containing a bushing slot for allowing oil to flow along the interior surface and out of the central bore;
   a lubrication circuit feed hole disposed on the outer surface of the generally hollow shaft, extending from the outer surface to the interior surface;

a bridge disposed within the generally hollow shaft preventing oil from flowing towards the rearward end;

a circular lubrication channel positioned between the interior surface and the outer surface; and the circular lubrication channel extends in the axial direction between the inner surface and the outer surface and after a distance makes about a 90 degree turn and extends in the radial direction to an exit in a top portion of the forward end.

2. The generally hollow shaft according to claim 1, wherein the circular lubrication channel extends between the interior surface and the forward end.

3. The generally hollow shaft according to claim 1, wherein the forward end comprises a top portion of the forward end, the circular lubrication channel extends between the interior surface and the top portion of the forward end.

4. The generally hollow shaft according to claim 1, wherein the interior surface is generally circumferential.

5. The generally hollow shaft according to claim 1, wherein the outer surface is generally circumferential.

6. The generally hollow shaft according to claim 1, further comprising a trough disposed adjacent the exit of the lubrication channel.

7. The generally hollow shaft according to claim 1, wherein the entrance to the lubrication channel is positioned in the axial direction, and after a distance the lubrication channel proceeds in the radial direction as the lubrication channel proceeds towards the forward end.

8. A generally hollow transmission input shaft, comprising:
a rearward end containing a plurality of splines, a forward end containing a plurality of splines, an interior circumferential surface, and an outer circumferential surface;
a central bore on the forward end of the generally hollow shaft
a bushing disposed within the central bore containing a bushing slot for allowing oil to flow along the interior circumferential surface and out of the central bore;
a lubrication circuit feed hole disposed on the outer circumferential surface of the generally hollow shaft, extending from the outer circumferential surface to the interior circumferential surface;
a bridge disposed within the inner portion of the generally hollow shaft preventing oil from flowing towards the rearward end; and
a circular lubrication channel disposed within the shaft and positioned between the interior circumferential surface and the outer circumferential surface with an entrance to the lubrication channel positioned on the interior circumferential surface of the shaft, wherein the lubrication channel extends in the axial direction between the inner circumferential surface and outer circumferential surface and after a distance makes about a 90 degree turn and extends in the radial direction to an exit in a top portion of the forward end.

9. The generally hollow transmission input shaft according to claim 8, wherein the lubrication channel extends between the interior circumferential surface and the forward end.

10. The generally hollow transmission input shaft according to claim 8, wherein the forward end comprises a top portion of the forward end, the lubrication channel extends between the interior circumferential surface and the top portion of the forward end.

11. The generally hollow transmission input shaft according to claim 8, further comprising a trough disposed adjacent the exit of the lubrication channel.

12. The generally hollow transmission input shaft according to claim 8, wherein the entrance to the lubrication channel is positioned in the axial direction, and after a distance the lubrication channel proceeds in the radial direction as the lubrication channel proceeds towards the forward end.

13. A generally hollow transmission input shaft, comprising:
a rearward end, a forward end with a top portion, an interior surface, and an outer surface;
a central bore on the forward end of the generally hollow shaft;
a bushing disposed within the central bore containing a bushing slot for allowing oil to flow along the interior surface and out of the central bore;
a lubrication circuit feed hole disposed on the outer surface of the generally hollow shaft, extending from the outer surface to the interior surface;
a bridge disposed within the generally hollow shaft preventing oil from flowing towards the rearward end;
a circular lubrication channel positioned between the interior surface and the outer surface having an entrance disposed within the interior surface and an exit on the top portion of the forward end; and
a trough positioned surrounding the exit of the channel and extends along the top portion of the shaft and towards the outer surface of the shaft.

14. The generally hollow transmission input shaft according to claim 13, wherein the entrance to the lubrication channel is positioned in the axial direction, and after a distance the lubrication channel makes about a 90 degree turn and proceeds in the radial direction as the lubrication channel proceeds towards the forward end.

15. The generally hollow transmission input shaft according to claim 13, wherein the interior surface is generally circumferential.

16. The generally hollow transmission input shaft according to claim 13, wherein the outer surface is generally circumferential.

\* \* \* \* \*